United States Patent
Alshina et al.

(10) Patent No.: US 8,532,416 B2
(45) Date of Patent: *Sep. 10, 2013

(54) METHOD AND APPARATUS FOR ENCODING AND DECODING AN IMAGE BY USING ROTATIONAL TRANSFORM

(75) Inventors: Elena Alshina, Suwon-si (KR); Alexander Alshin, Suwon-si (KR); Vadim Seregin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

This patent is subject to a terminal disclaimer.

(21) Appl. No.: 12/855,901

(22) Filed: Aug. 13, 2010

(65) Prior Publication Data
US 2011/0038555 A1 Feb. 17, 2011

(30) Foreign Application Priority Data
Aug. 13, 2009 (KR) .................. 10-2009-0074898

(51) Int. Cl.
*G06K 9/36* (2006.01)
(52) U.S. Cl.
USPC .......................................... 382/244
(58) Field of Classification Search
USPC ............... 382/232–251; 375/240.01–240.29; 708/400–405
See application file for complete search history.

(56) References Cited

U.S. PATENT DOCUMENTS

| | | | |
|---|---|---|---|
| 5,881,177 A | 3/1999 | Kim | |
| 6,185,595 B1 * | 2/2001 | Hori et al. | 708/402 |
| 6,298,166 B1 * | 10/2001 | Ratnakar et al. | 382/248 |
| 7,848,580 B2 * | 12/2010 | Horie et al. | 382/232 |
| 8,064,711 B2 * | 11/2011 | Alshina et al. | 382/250 |
| 2002/0114388 A1 | 8/2002 | Ueda et al. | |

FOREIGN PATENT DOCUMENTS
WO 2005/076614 A1 8/2005

OTHER PUBLICATIONS
International Search Report (PCT/ISA/210) and Written Opinion (PCT/ISA/237) dated Feb. 22, 2011, in Application No. PCT/KR2010/005366.

\* cited by examiner

*Primary Examiner* — Ishrat I Sherali
(74) *Attorney, Agent, or Firm* — Sughrue Mion, PLLC

(57) ABSTRACT

A method and apparatus for encoding an image is provided. The method and apparatus include quantizing and entropy encoding a second frequency coefficient matrix that is generated by performing a partial exchange of one or more values between rows and between columns of a first frequency coefficient matrix. A method and apparatus for decoding image data that is encoded by using the method and apparatus for encoding the image is also provided.

19 Claims, 15 Drawing Sheets

4x4 TRANSFORM

8x8 TRANSFORM

8x8 TRANSFORM

METHOD AND APPARATUS FOR ENCODING AND DECODING AN IMAGE BY USING ROTATIONAL TRANSFORM

CROSS-REFERENCE TO RELATED PATENT APPLICATION

This application claims priority from Korean Patent Application No. 10-2009-0074898, filed on Aug. 13, 2009, in the Korean Intellectual Property Office, the disclosure of which is incorporated herein in its entirety by reference.

BACKGROUND

1. Field

Methods and apparatuses consistent with the exemplary embodiments relate to a method and apparatus for encoding and decoding an image, and more particularly, to a method and apparatus for encoding and decoding coefficients of a frequency domain.

2. Description of the Related Art

In order to perform image compression, most image encoding and decoding methods and apparatuses encode an image by transforming an image of a pixel domain to coefficients of a frequency domain. A discrete cosine transform (DCT) is a frequency transform technique that is widely used in image or sound compression. In recent years, research has been conducted to search for a more efficient coding method. With respect to audio coding, parametric coding achieves a better result than DCT. With respect to two-dimensional (2D) data, although Karhunen Loeve Transform (KLT) coefficients have the smallest bit size, a size of overhead information is significantly increased.

SUMMARY

The exemplary embodiments provide a method and apparatus for encoding and decoding an image.

The exemplary embodiments also provide a computer readable recording medium having recorded thereon a program for executing the method.

According to an aspect of the exemplary embodiments, there is provided a method of encoding an image, the method comprising: generating a first frequency coefficient matrix by transforming a predetermined block to a frequency domain; generating a second frequency coefficient matrix by performing a partial exchange of one or more values between rows and between columns of the first frequency coefficient matrix based on an angle parameter; quantizing the second frequency coefficient matrix; and entropy-encoding the second frequency coefficient matrix and information regarding the angle parameter, wherein the angle parameter is a parameter that indicates a level of the partial exchange of the one or more values between the rows and between the columns.

According to another aspect of the exemplary embodiments, there is provided an image encoding apparatus comprising: a transformer for generating a first frequency coefficient matrix by transforming a predetermined block to a frequency domain and generating a second frequency coefficient matrix by performing a partial exchange of one or more values between rows and between columns of the first frequency coefficient matrix based on an angle parameter; a quantization unit for quantizing the second frequency coefficient matrix; and an entropy encoder for entropy-encoding the second frequency coefficient matrix and information regarding the angle parameter, wherein the angle parameter is a parameter that indicates a level of the partial exchange of the one or more values between the rows and between the columns.

According to another aspect of the exemplary embodiments, there is provided a method of decoding an image, the method comprising: entropy-decoding a second frequency coefficient matrix and information regarding an angle parameter; inverse-quantizing the second frequency coefficient matrix; generating a first frequency coefficient matrix by performing a partial exchange of one or more values between rows and between columns of the second frequency coefficient matrix based on the angle parameter; and inverse-transforming the first frequency coefficient matrix to a pixel domain, and reconstructing a predetermined block, wherein the angle parameter is a parameter that indicates a level of the partial exchange of the one or more values between the rows and between the columns.

According to another aspect of the exemplary embodiments, there is provided an image decoding apparatus comprising: an entropy decoder for entropy-decoding a second frequency coefficient matrix and information regarding an angle parameter; an inverse-quantization unit for inverse-quantizing the second frequency coefficient matrix; an inverse-transformer for generating a first frequency coefficient matrix by performing a partial exchange of one or more values between rows and between columns of the second frequency coefficient matrix based on the angle parameter; and inverse-transforming the first frequency coefficient matrix to a pixel domain, and reconstructing a predetermined block, wherein the angle parameter is a parameter that indicates a level of the partial exchange of the one or more values between the rows and between the columns.

According to another aspect of the exemplary embodiments, there is provided a computer readable recording medium storing a computer readable program for executing the method of encoding an image and the method of decoding an image.

BRIEF DESCRIPTION OF THE DRAWINGS

The above and other features will become more apparent by describing in detail exemplary embodiments thereof with reference to the attached drawings in which.

DETAILED DESCRIPTION OF THE EXEMPLARY EMBODIMENTS

Hereinafter, the exemplary embodiments will be described in detail with reference to the attached drawings. In the present specification, an "image" may denote a still image for a video or a moving image, that is, the video itself.

Figure 1:
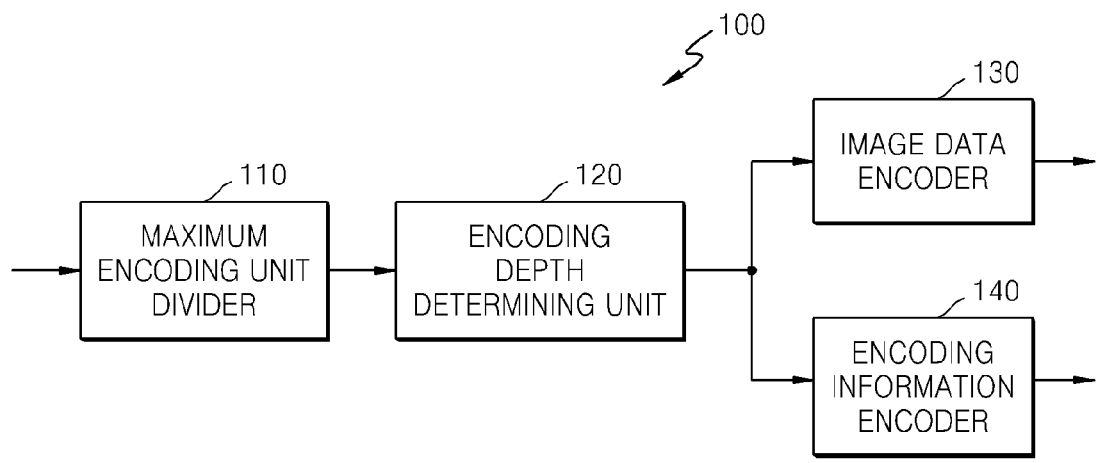
FIG. 1 is a diagram of an image encoding apparatus according to an exemplary embodiment.

FIG. 1 is a block diagram of an apparatus 100 for encoding an image, according to an exemplary embodiment.

Referring to FIG. 1, the apparatus 100 includes a maximum encoding unit divider 110, an encoding depth determining unit 120, an image data encoder 130, and an encoding information encoder 140.

The maximum encoding unit divider 110 can divide a current picture or slice based on a maximum coding unit that is a coding unit of the largest size. That is, the maximum encoding unit divider 110 can divide the current picture or slice to obtain at least one maximum coding unit.

According to an exemplary embodiment, a coding unit can be represented using a maximum coding unit and a depth. As described above, the maximum coding unit indicates an encoding unit having the largest size from among coding units of the current picture, and the depth indicates the size of a sub coding unit obtained by hierarchically decreasing the coding unit. As a depth increases, a coding unit can decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a $k^{th}$ depth can include a plurality of sub coding units of a $(k+n)^{th}$ depth (k and n are integers equal to or greater than 1).

According to an increase of the size of a picture to be encoded, encoding an image in a greater coding unit can cause a higher image compression ratio. However, if a greater coding unit is fixed, an image cannot be efficiently encoded by reflecting continuously changing image characteristics.

For example, when a smooth area such as the sea or sky is encoded, the greater a coding unit is, the more a compression ratio can increase. However, when a complex area such as people or buildings is encoded, the smaller a coding unit is, the more a compression ratio can increase.

Accordingly, according to an exemplary embodiment, a different maximum image coding unit and a different maximum depth are set for each picture or slice. Since a maximum depth denotes the maximum number of times by which a coding unit can decrease, the size of each minimum coding unit included in a maximum image coding unit can be variably set according to a maximum depth.

The encoding depth determining unit 120 determines a maximum depth. The maximum depth can be determined based on a calculation of Rate-Distortion (R-D) cost. The maximum depth may be determined differently for each picture or slice or for each maximum coding unit. The determined maximum depth is provided to the encoding information encoder 140, and image data according to maximum coding units is provided to the image data encoder 130.

The maximum depth denotes a coding unit having the smallest size, which can be included in a maximum coding unit, i.e., a minimum coding unit. In other words, a maximum coding unit can be divided into sub coding units having different sizes according to different depths. This is described in detail later with reference to FIGS. 8A and 8B. In addition, the sub coding units having different sizes, which are included in the maximum coding unit, can be predicted or transformed based on processing units having different sizes. In other words, the apparatus 100 can perform a plurality of processing operations for image encoding based on processing units having various sizes and various shapes. To encode image data, processing operations such as prediction, transformation, and entropy encoding are performed, wherein processing units having the same size may be used for every operation or processing units having different sizes may be used for every operation.

For example, the apparatus 100 can select a processing unit that is different from a coding unit to predict the coding unit. When the size of a coding unit is 2N×2N (where N is a positive integer), processing units for prediction may be 2N×2N, 2N×N, N×2N, and N×N. In other words, motion prediction may be performed based on a processing unit having a shape whereby at least one of height and width of a coding unit is equally divided by two. Hereinafter, a processing unit, which is the base of prediction, is defined as a 'prediction unit'.

A prediction mode may be at least one of an intra mode, an inter mode, and a skip mode. A specific prediction mode can be performed for only a prediction unit having a specific size or shape. For example, the intra mode can be performed for only prediction units having the sizes of 2N×2N and N×N of which the shape is a square. Further, the skip mode can be performed for only a prediction unit having the size of 2N×2N. If a plurality of prediction units exist in a coding unit, the prediction mode with the least encoding errors can be selected after performing prediction for every prediction unit.

Alternatively, the apparatus 100 can perform transformation on image data to frequency domain based on a processing unit having a different size from a coding unit. For the frequency transformation in the coding unit, the frequency transformation can be performed based on a processing unit having a size equal to or smaller than that of the coding unit. Hereinafter, a processing unit, which is the base of frequency transformation, is defined as a 'transformation unit'. The frequency transformation may be any transform; for example, a Discrete Cosine Transform (DCT) or a Karhunen Loeve Transform (KLT).

The encoding depth determining unit 120 can determine sub coding units included in a maximum coding unit using RD optimization based on a Lagrangian multiplier. In other words, the encoding depth determining unit 120 can determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determining unit 120.

The encoding information encoder 140 encodes information about an encoding mode of the maximum coding unit determined by the encoding depth determining unit 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit can include information about a prediction unit of the sub coding unit, information about a prediction mode for each prediction unit, and information about a transformation unit of the sub coding unit.

Since sub coding units having different sizes exist for each maximum coding unit and information about an encoding mode must be determined for each sub coding unit, information about at least one encoding mode can be determined for one maximum coding unit.

The apparatus 100 can generate sub coding units by equally dividing both height and width of a maximum coding unit by two according to an increase of depth. That is, when the size of a coding unit of a $k^{th}$ depth is 2N×2N, the size of a coding unit of a $(k+1)^{th}$ depth is N×N.

Accordingly, the apparatus 100 according to an exemplary embodiment can determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions can be more efficiently encoded.

Figure 2:
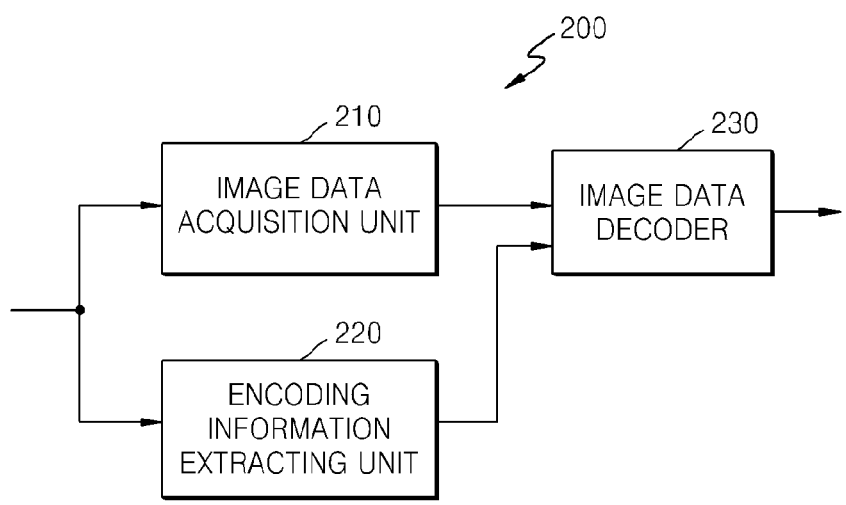
FIG. 2 is a diagram of an image decoding apparatus according to another exemplary embodiment.

FIG. 2 is a block diagram of an apparatus 200 for decoding an image according to an exemplary embodiment.

Referring to FIG. 2, the apparatus 200 includes an image data acquisition unit 210, an encoding information extracting unit 220, and an image data decoder 230.

The image data acquisition unit 210 acquires image data according to maximum coding units by parsing a bitstream received by the apparatus 200 and outputs the image data to the image data decoder 230. The image data acquisition unit 210 can extract information about a maximum coding unit of a current picture or slice from a header of the current picture or slice. In other words, the image data acquisition unit 210 divides the bitstream in the maximum coding unit so that the image data decoder 230 can decode the image data according to maximum coding units.

The encoding information extracting unit 220 extracts information about a maximum coding unit, a maximum depth, a division shape of the maximum coding unit, and an encoding mode of sub coding units from the header of the current picture by parsing the bitstream received by the apparatus 200. The information about a division shape and the information about an encoding mode are provided to the image data decoder 230.

The information about a division shape of the maximum coding unit can include information about sub coding units having different sizes according to depths included in the maximum coding unit, and the information about an encoding mode can include information about a prediction unit according to sub coding unit, information about a prediction mode, and information about a transformation units.

The image data decoder 230 restores the current picture by decoding image data of every maximum coding unit based on the information extracted by the encoding information extracting unit 220. The image data decoder 230 can decode sub coding units included in a maximum coding unit based on the information about a division shape of the maximum coding unit. A decoding process can include a prediction process including intra prediction and motion compensation and a inverse transformation process.

The image data decoder 230 can perform intra prediction or inter prediction based on information about a prediction unit and information about a prediction mode in order to predict a prediction unit. The image data decoder 230 can also perform inverse transformation for each sub coding unit based on information about a transformation unit of a sub coding unit.

Figure 3:
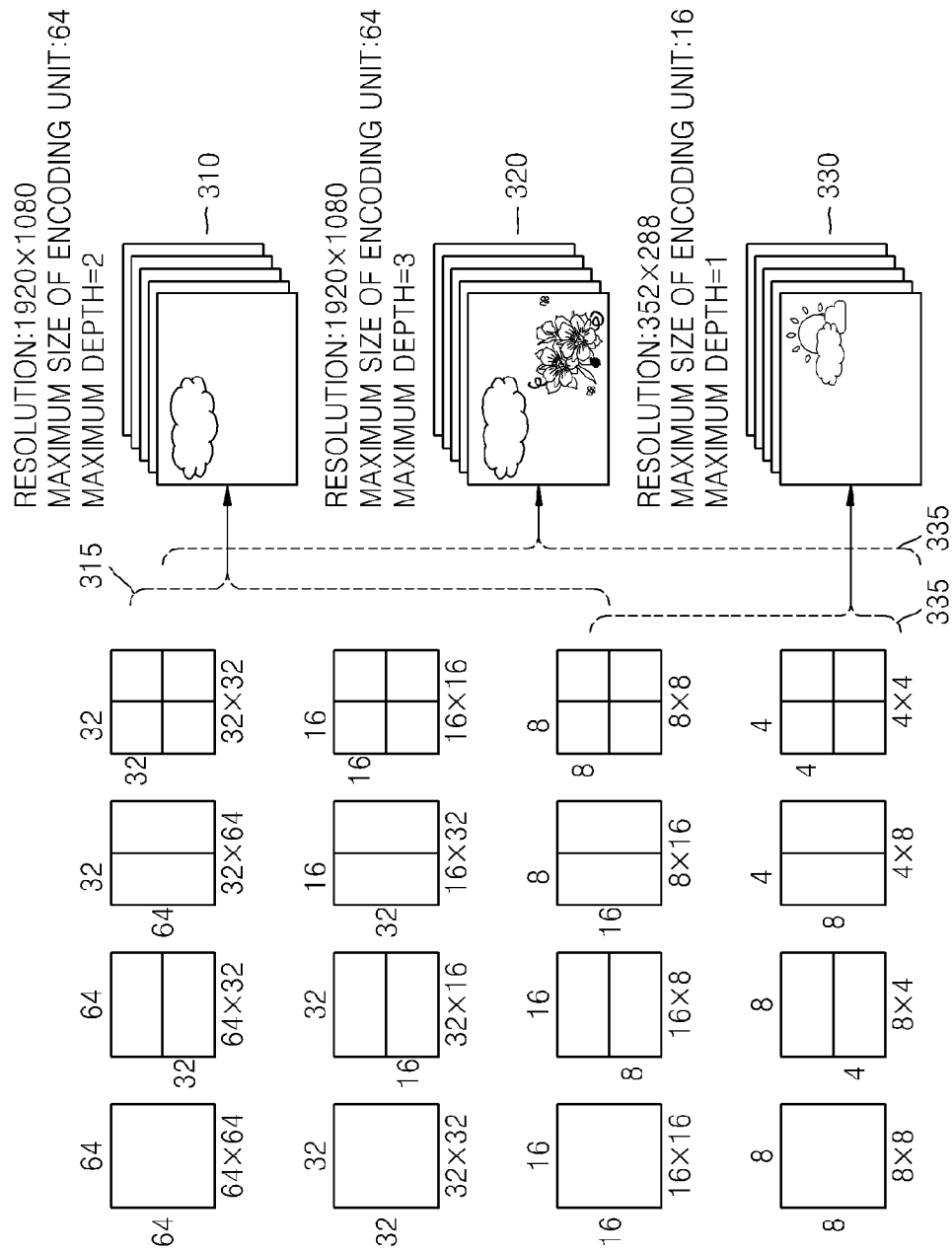
FIG. 3 is a diagram of a hierarchical coding unit according to another exemplary embodiment.

FIG. 3 illustrates hierarchical coding units according to an exemplary embodiment.

Referring to FIG. 3, the hierarchical coding units according to an exemplary embodiment can include coding units whose dimensions are 64×64, 32×32, 16×16, 8×8, and 4×4. Besides these coding units having perfect square shapes, coding units whose dimensions are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 1.

When the resolution is high or the amount of data is great, it is preferable that a maximum size of a coding unit is relatively great to increase a compression ratio and exactly reflect image characteristics. Accordingly, for the image data 310 and 320 having higher resolution than the image data 330, 64×64 can be selected as the size of a maximum coding unit.

A maximum depth indicates the total number of layers in the hierarchical coding units. Since the maximum depth of the image data 310 is 2, a coding unit 315 of the image data 310 can include a maximum coding unit whose longer axis size is 64 and sub coding units whose longer axis sizes are 32 and 16, according to an increase of a depth.

On the other hand, since the maximum depth of the image data 330 is 1, a coding unit 335 of the image data 330 can include a maximum coding unit whose longer axis size is 16 and coding units whose longer axis sizes is 8, according to an increase of the depth.

However, since the maximum depth of the image data 320 is 3, a coding unit 325 of the image data 320 can include a maximum coding unit whose longer axis size is 64 and sub coding units whose longer axis sizes are 32, 16, 8 and 4 according to an increase of the depth. Since an image is encoded based on a smaller sub coding unit as a depth increases, the exemplary embodiment is suitable for encoding an image including more minute scenes.

Figure 4:
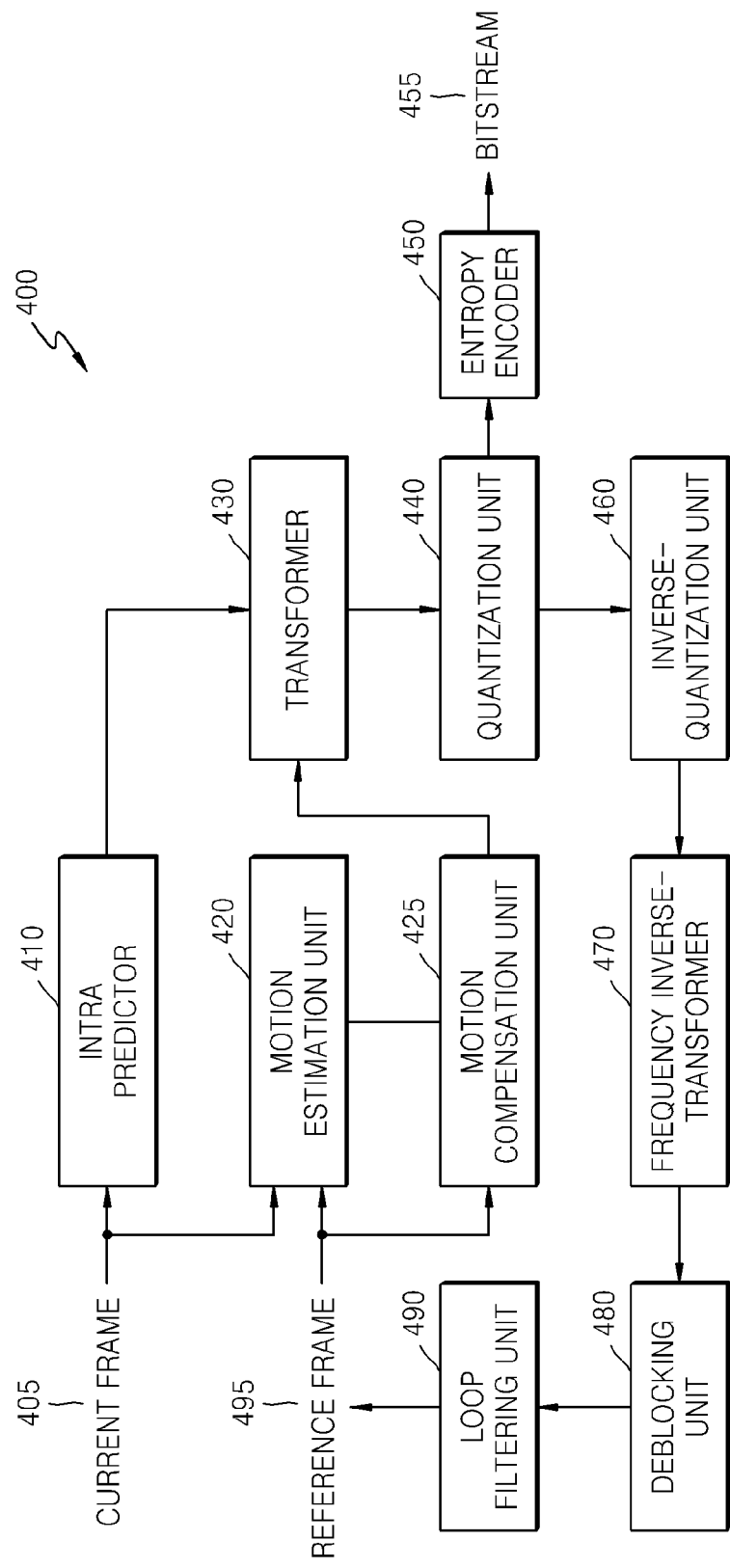
FIG. 4 is a block diagram of an image encoder based on a coding unit according to another exemplary embodiment.

FIG. 4 is a block diagram of an image encoder 400 based on a coding unit, according to an exemplary embodiment.

An intra predictor 410 performs intra prediction on prediction units of the intra mode in a current frame 405, and a motion estimation unit 420 and a motion compensation unit 425 perform inter prediction and motion compensation on prediction units of the inter mode using the current frame 405 and a reference frame 495.

Residual values are generated based on the prediction units output from the intra predictor 410, the motion estimation unit 420, and the motion compensation unit 425, and the generated residual values are output as quantized transform coefficients by passing through a transformer 430 and a quantization unit 440.

The quantized transform coefficients are restored to residual values by passing through an inverse-quantization unit 460 and a frequency inverse-transformer 470, and the restored residual values are post-processed by passing through a deblocking unit 480 and a loop filtering unit 490 and output as the reference frame 495. The quantized transform coefficients can be output as a bitstream 455 by passing through an entropy encoder 450.

To perform encoding based on an encoding method according to an exemplary embodiment, components of the image encoder 400, i.e., the intra predictor 410, the motion estimation unit 420, the motion compensation unit 425, the transformer 430, the quantization unit 440, the entropy encoder 450, the inverse-quantization unit 460, the frequency inverse-transformer 470, the deblocking unit 480 and the loop filtering unit 490, perform image encoding processes based on a maximum coding unit, a sub coding unit according to depths, a prediction unit, and a transformation unit.

Figure 5:
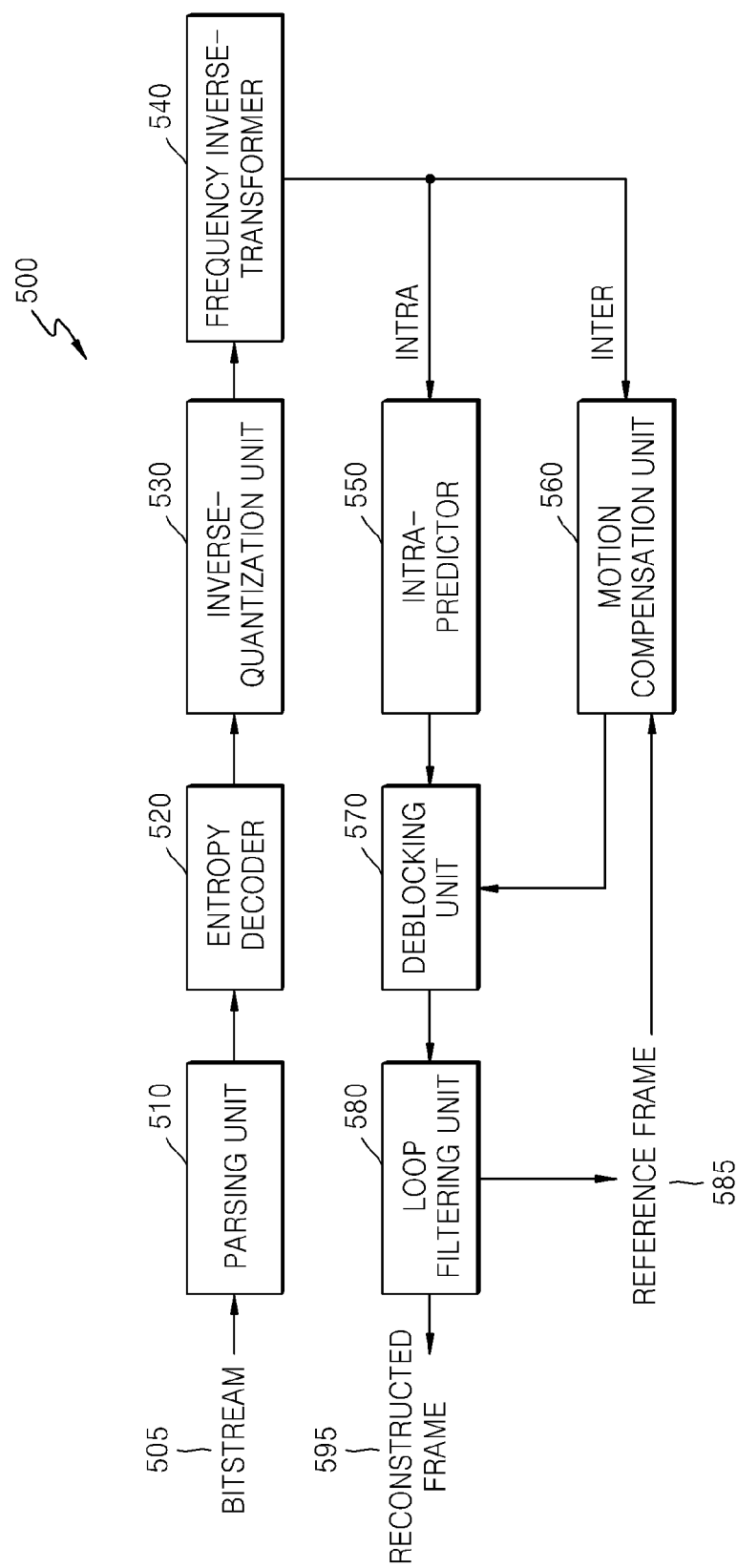
FIG. 5 is a block diagram of an image decoder based on a coding unit according to another exemplary embodiment.

FIG. 5 is a block diagram of an image decoder 500 based on a coding unit, according to an exemplary embodiment.

A bitstream 505 passes through a parsing unit 510 so that encoded image data to be decoded and encoding information necessary for decoding are parsed. The encoded image data is output as dequantized data by passing through an entropy decoder 520 and an inverse-quantization unit 530 and restored to residual values by passing through a frequency inverse-transformer 540. The residual values are restored according to coding units by being added to an intra prediction result of an intra predictor 550 or a motion compensation result of a motion compensation unit 560. The restored coding units are used for prediction of next coding units or a next picture by passing through a deblocking unit 570 and a loop filtering unit 580.

To perform decoding based on a decoding method according to an exemplary embodiment, components of the image decoder 500, i.e., the parsing unit 510, the entropy decoder 520, the inverse-quantization unit 530, the frequency inverse-transformer 540, the intra predictor 550, the motion compensation unit 560, the deblocking unit 570 and the loop filtering unit 580, perform image decoding processes based on a maximum coding unit, a sub coding unit according to depths, a prediction unit, and a transformation unit.

In particular, the intra predictor 550 and the motion compensation unit 560 determine a prediction unit and a prediction mode in a sub coding unit by considering a maximum coding unit and a depth, and the frequency inverse-transformer 540 performs inverse transformation by considering the size of a transformation unit.

Figure 6:
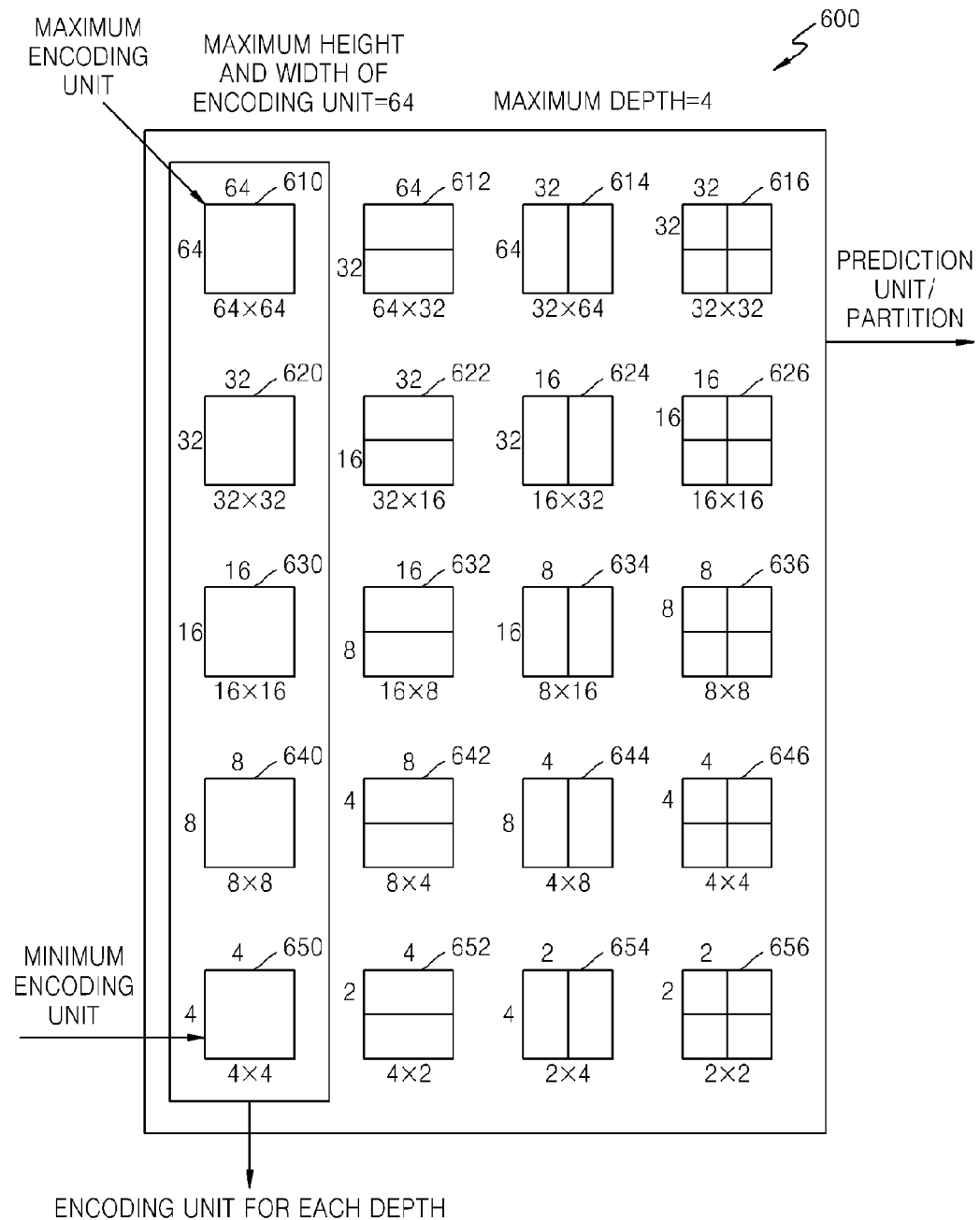
FIG. 6 illustrates a maximum coding unit, sub-coding units, and prediction units according to another exemplary embodiment.

FIG. 6 illustrates a maximum coding unit, a sub coding unit, and a prediction unit, according to an exemplary embodiment.

The apparatus 100 and the apparatus 200 according to an exemplary embodiment use hierarchical coding units to perform encoding and decoding in consideration of image characteristics. A maximum coding unit and a maximum depth can be adaptively set according to the image characteristics or variously set according to requirements of a user.

A hierarchical coding unit structure 600 according to an exemplary embodiment illustrates a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum encoding unit 610 and the sub coding units 620 to 650 are shown along a horizontal axis of the hierarchical coding unit structure 600.

The maximum encoding unit 610 has a depth of 0 and the size of a coding unit, i.e., height and width, of 64×64. A depth increases along the vertical axis, and there exist a sub encoding unit 620 whose size is 32×32 and depth is 1, a sub encoding unit 630 whose size is 16×16 and depth is 2, a sub encoding unit 640 whose size is 8×8 and depth is 3, and a sub encoding unit 650 whose size is 4×4 and depth is 4. The sub encoding unit 650 whose size is 4×4 and depth is 4 is a minimum encoding unit, and the minimum encoding unit may be divided into prediction units, each of which is less than the minimum encoding unit.

Referring to FIG. 6, examples of a prediction unit are shown along the horizontal axis according to each depth. That is, a prediction unit of the maximum encoding unit 610 whose depth is 0 may be a prediction unit whose size is equal to the encoding unit 610, i.e., 64×64, or a prediction unit 612 whose size is 64×32, a prediction unit 614 whose size is 32×64, or a prediction unit 616 whose size is 32×32, which has a size smaller than the encoding unit 610 whose size is 64×64.

A prediction unit of the encoding unit 620 whose depth is 1 and size is 32×32 may be a prediction unit whose size is equal to the encoding unit 620, i.e., 32×32, or a prediction unit 622 whose size is 32×16, a prediction unit 624 whose size is 16×32, or a prediction unit 626 whose size is 16×16, which has a size smaller than the encoding unit 620 whose size is 32×32.

A prediction unit of the encoding unit 630 whose depth is 2 and size is 16×16 may be a prediction unit whose size is equal to the encoding unit 630, i.e., 16×16, or a prediction unit 632 whose size is 16×8, a prediction unit 634 whose size is 8×16, or a prediction unit 636 whose size is 8×8, which has a size smaller than the encoding unit 630 whose size is 16×16.

A prediction unit of the encoding unit 640 whose depth is 3 and size is 8×8 may be a prediction unit whose size is equal to the encoding unit 640, i.e., 8×8, or a prediction unit 642 whose size is 8×4, a prediction unit 644 whose size is 4×8, or a prediction unit 646 whose size is 4×4, which has a size smaller than the encoding unit 640 whose size is 8×8.

Finally, the encoding unit 650 whose depth is 4 and size is 4×4 is a minimum encoding unit and an encoding unit of a maximum depth, and a prediction unit of the encoding unit 650 may be a prediction unit 650 whose size is 4×4, a prediction unit 652 having a size of 4×2, a prediction unit 654 having a size of 2×4, or a prediction unit 656 having a size of 2×2.

Figure 7:
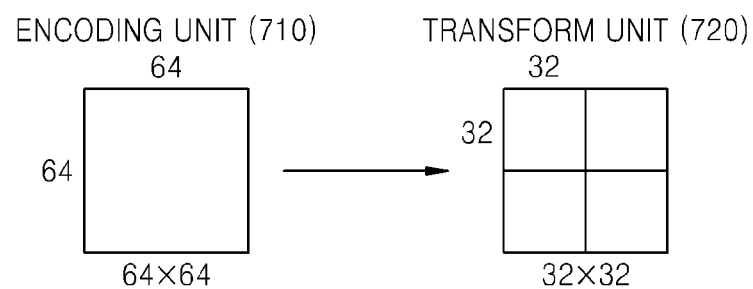
FIG. 7 is a diagram of a coding unit and a transformation unit according to another exemplary embodiment.

FIG. 7 illustrates an encoding unit and a transform unit, according to an exemplary embodiment.

The apparatus 100 and the apparatus 200, according to an exemplary embodiment, perform encoding with a maximum encoding unit itself or with sub coding units, which are equal to or smaller than the maximum encoding unit, divided from the maximum encoding unit.

In the encoding process, the size of a transform unit for frequency transformation is selected to be no larger than that of a corresponding encoding unit. For example, when a current encoding unit 710 has the size of 64×64, frequency transformation can be performed using a transform unit 720 having the size of 32×32.

Figure 8A:
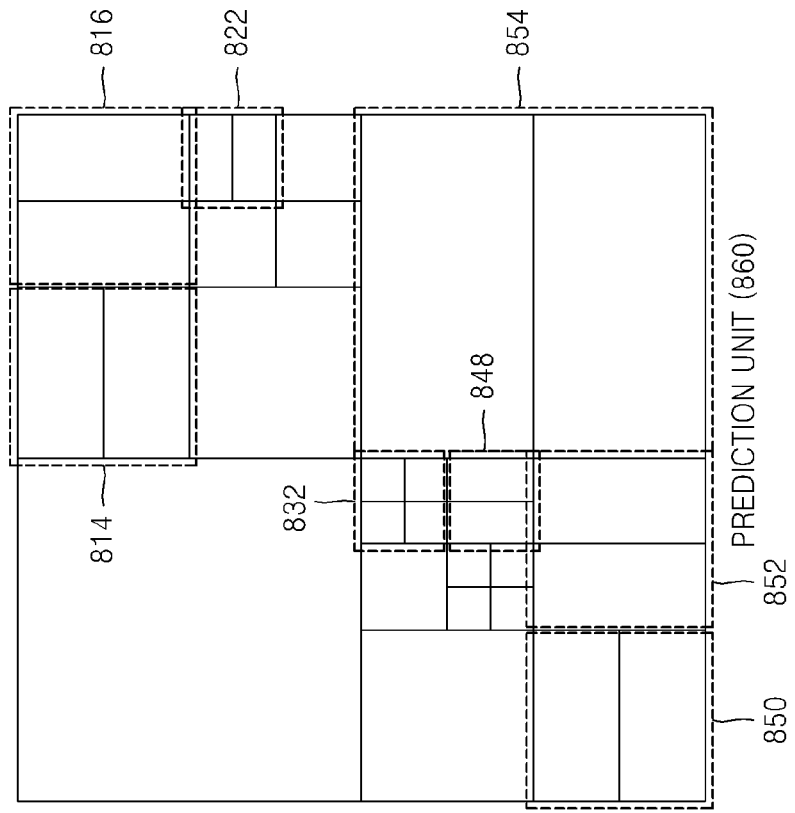
FIGS. 8A and 8B illustrate division forms of a maximum coding unit, a prediction unit, and a transformation unit according to another exemplary embodiment.
Figure 8A:
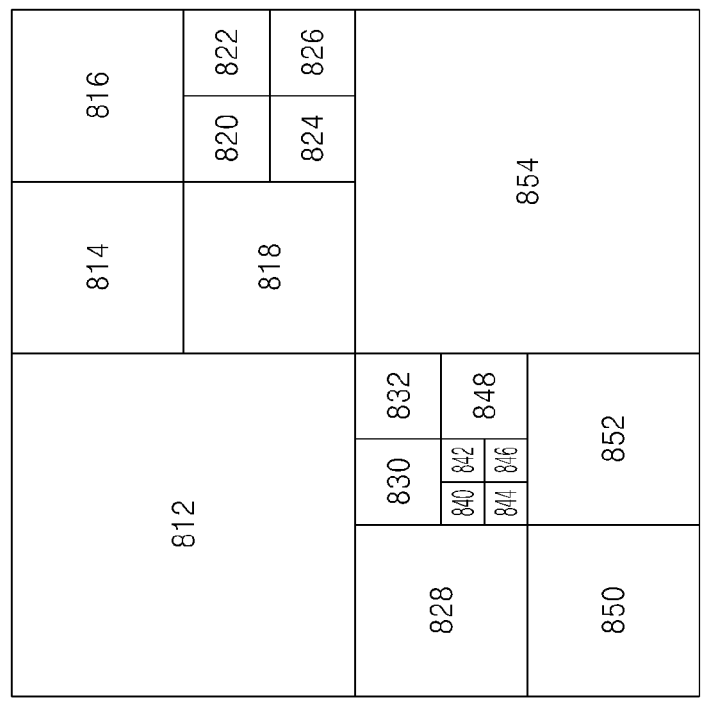
Figure 8B:
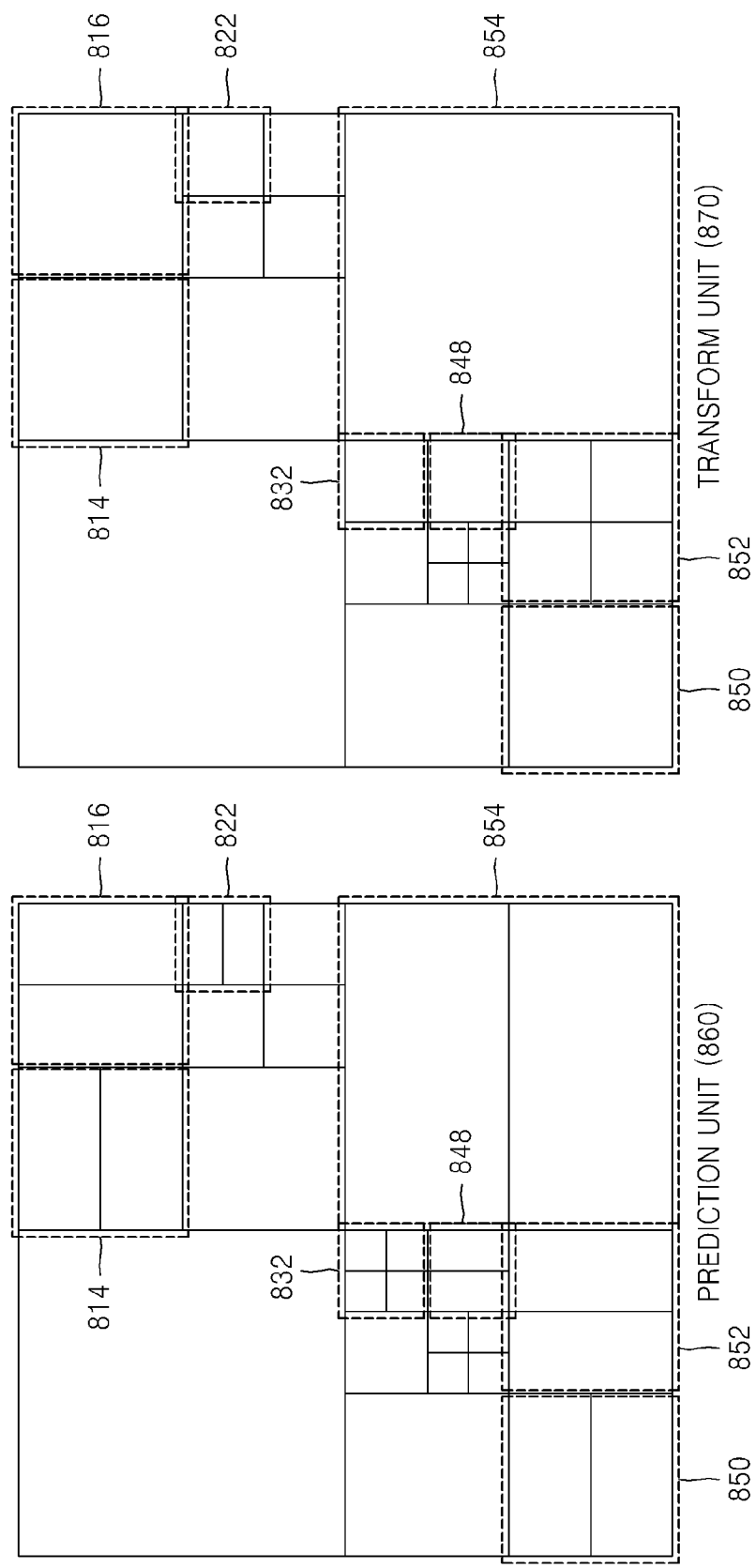

FIGS. 8A and 8B illustrate division shapes of a coding unit, a prediction unit, and a frequency transformation unit, according to an exemplary embodiment.

FIG. 8A illustrates a coding unit and a prediction unit, according to an exemplary embodiment.

A left side of FIG. 8A shows a division shape selected by the apparatus 100, according to an exemplary embodiment, in order to encode a maximum encoding unit 810. The apparatus 100 divides the maximum encoding unit 810 into various shapes, performs encoding, and selects an optimal division shape by comparing encoding results of various division shapes with each other based on R-D cost. When it is optimal that the maximum encoding unit 810 is encoded as it is, the maximum coding unit 810 may be encoded without dividing the maximum coding unit 810 as illustrated in FIGS. 8A and 8B.

Referring to the left side of FIG. 8A, the maximum encoding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

The right side of FIG. 8A shows a division shape of a prediction unit for the maximum encoding unit 810.

Referring to the right side of FIG. 8A, a prediction unit 860 for the maximum encoding unit 810 can be divided differently from the maximum encoding unit 810. In other words, a prediction unit for each of sub coding units can be smaller than a corresponding sub coding unit.

For example, a prediction unit for a sub coding unit 854 located in a lower-right side among the sub coding units whose depths are 1 can be smaller than the sub coding unit 854. In addition, prediction units for some (814, 816, 850, and 852) of sub coding units 814, 816, 850, and 852 whose depths are 2 can be smaller than the sub coding units 814, 816, 850, and 852, respectively. In addition, prediction units for sub coding units 822, 832, and 848 whose depths are 3 can be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

FIG. 8B illustrates a prediction unit and a transform unit, according to an exemplary embodiment.

A left side of FIG. 8B shows a division shape of a prediction unit for the maximum encoding unit 810 shown in the right side of FIG. 8A, and a right side of FIG. 8B shows a division shape of a transform unit of the maximum encoding unit 810.

Referring to the right side of FIG. 8B, a division shape of a transform unit 870 can be set differently from the prediction unit 860.

For example, even though a prediction unit for the encoding unit 854 whose depth is 1 is selected with a shape whereby the height of the encoding unit 854 is equally divided by two, a transform unit can be selected with the same size as the encoding unit 854. Likewise, even though prediction units for encoding units 814 and 850 whose depths are 2 are selected with a shape whereby the height of each of the encoding units 814 and 850 is equally divided by two, a transform unit can be selected with the same size as the original size of each of the encoding units 814 and 850.

A transform unit may be selected with a smaller size than a prediction unit. For example, when a prediction unit for the encoding unit 852 whose depth is 2 is selected with a shape whereby the width of the encoding unit 852 is equally divided by two, a transform unit can be selected with a shape whereby the encoding unit 852 is equally divided by four in directions of height and width, which has a smaller size than the shape of the prediction unit.

Figure 9:
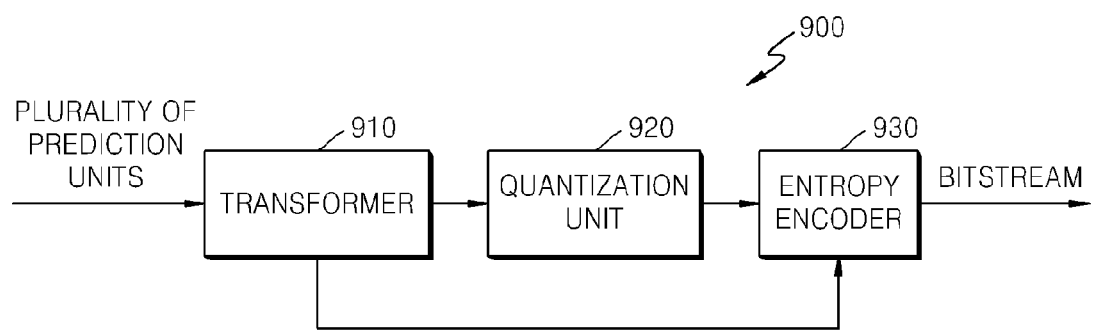
FIG. 9 is a block diagram of an image encoding apparatus according to another exemplary embodiment.

FIG. 9 is a block diagram of an image encoding apparatus 900 according to another exemplary embodiment.

The image encoding apparatus 900 of FIG. 9 may be a module that is included in the image encoding apparatus 100 of FIG. 1 or in the image encoder 400 of FIG. 4 and that performs image encoding procedures to be described later. Referring to FIG. 9, the image encoding apparatus 900 according to the present exemplary embodiment includes a transformer 910, a quantization unit 920, and an entropy encoder 930.

The transformer 910 receives a predetermined block and transforms it to a frequency domain. The predetermined block is transformed according to a predetermined transform algorithm, and then coefficients of the frequency domain are generated. The transformer 910 may use one of algorithms involving transforming a block of a pixel domain to coefficients of a frequency domain. For example, the predetermined block may be transformed to the frequency domain by using a discrete cosine transform (DCT) or Karhunen Loeve Transform (KLT). The predetermined block may be a residual block. Also, the predetermined block may be a block of the transform unit described in relation to FIG. 7 or FIG. 8B.

Also, the transformer 910 performs a post process involving exchanging one or more values between rows and between columns of the matrix including the coefficients of the frequency domain which are generated as a result of the transform, and the post process will be described in detail with reference to FIGS. 10, and 11A through 11C.

Figure 10:
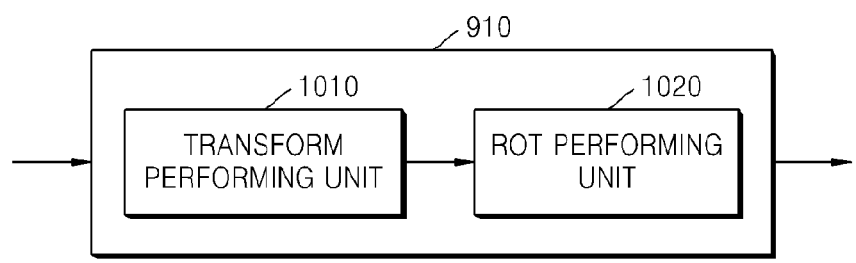
FIG. 10 is a diagram of the transformer according to another exemplary embodiment.

FIG. 10 is a diagram of the transformer 910 according to an exemplary embodiment.

Referring to FIG. 10, the transformer 910 includes a transform performing unit 1010 and a rotational transform (ROT) performing unit 1020.

The transform performing unit 1010 receives a predetermined block, transforms it to a frequency domain, and generates a frequency coefficient matrix. For example, as described above, by performing a DCT or KLT, the frequency coefficient matrix including coefficients of a frequency domain may be generated.

The ROT performing unit 1020 receives the frequency coefficient matrix generated by the transform performing unit 1010, performs a ROT, and then generates an adjusted frequency coefficient matrix. The ROT may correspond to a transform by which one or more values between rows and between columns are exchanged. The ROT will be described in detail with reference to FIGS. 11A through 11C.

Figure 11A:
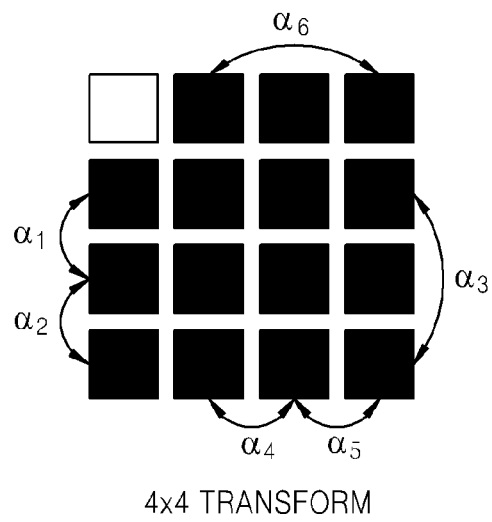
FIGS. 11A through 11C illustrate a rotational transform (ROT) according to another exemplary embodiment.
Figure 11B:
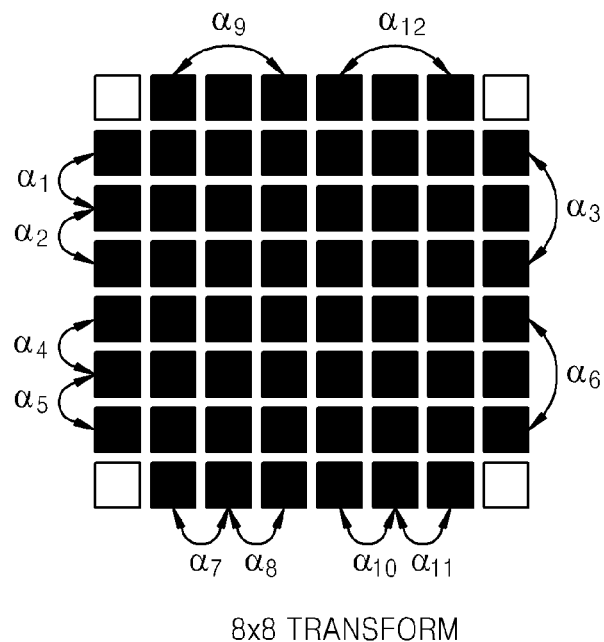
Figure 11C:
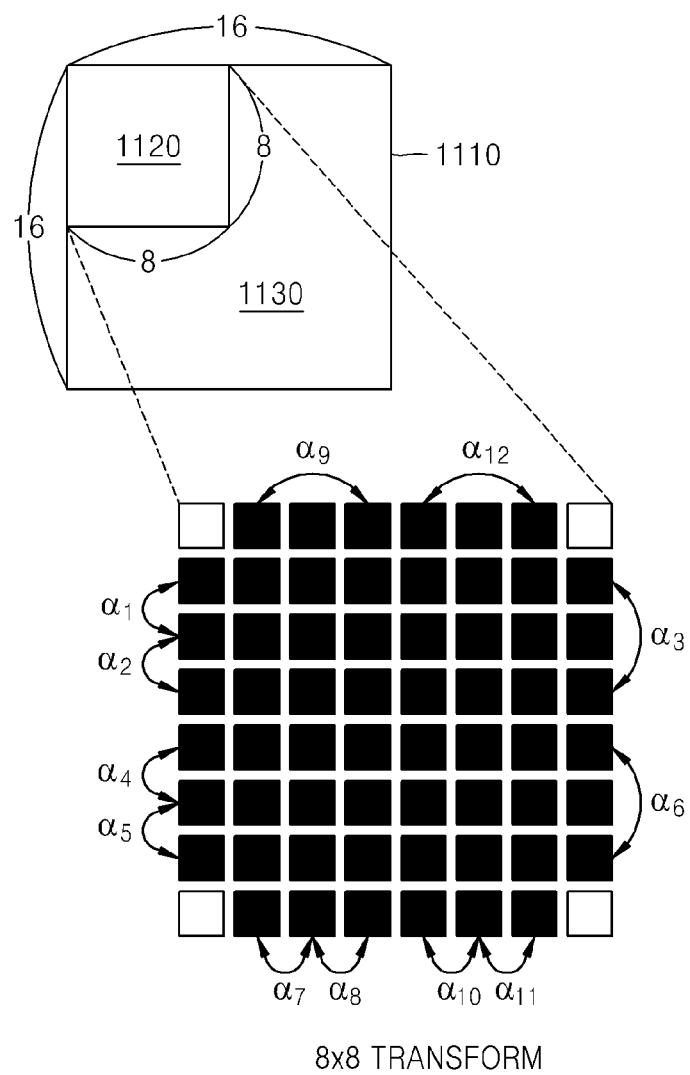

FIGS. 11A through 11C illustrate a ROT according to an exemplary embodiment.

The ROT performing unit 1020 partially exchanges one or more values between rows and between columns of the frequency coefficient matrix. The exchange between rows and between columns of the frequency coefficient matrix will now be described with reference to FIGS. 11A through 11C.

According to the one or more exemplary embodiments, the partial exchange between rows or between columns does not indicate that values of a specific row or a specific column are unconditionally exchanged as a one-to-one correspondence but indicates that values between two rows or two columns are partially exchanged by using a specific function including a sinusoidal function.

For example, an exchange between two rows A and B may be defined as Equation 1 according to a value of a parameter a.

$$\text{Row } A(\text{new}) = \cos(a) * \text{row } A(\text{old}) - \sin(a) * \text{row } B(\text{old})$$

$$\text{Row } B(\text{new}) = \sin(a) * \text{row } A(\text{old}) + \cos(a) * \text{row } B(\text{old}) \quad \text{[Equation 1]}$$

Referring to Equation 1, the parameter 'a' functions as an angle. Thus, in the one or more embodiments of the present invention, the parameter 'a', which indicates a level of a partial exchange between rows and between columns of a DCT transform matrix, is defined as an angle parameter.

In a case where a value of the parameter 'a' is 0 degree, the case means that an exchange does not occur. Also, in a case where a value of the parameter 'a' is 90 degrees, an entire exchange occurs between rows.

In a case where a value of the parameter 'a' has a value greater than 90 degree and less than 180 degree, the case means that an exchange occurs between rows, and a sign of an element value is changed. In a case where a value of the parameter 'a' is 180 degree, an exchange does not occur between rows but a sign of all elements included in each of the rows is changed. In the one or more exemplary embodiments, a partial exchange between columns is defined in the same manner as the partial exchange between the rows.

FIG. 11A illustrates a case in which a ROT is performed on a 4×4 frequency coefficient matrix. Referring to FIG. 11A, three parameters $\alpha_1, \alpha_2, \alpha_3$ are used in a partial exchange between rows of a frequency coefficient matrix, and three parameters $\alpha_4, \alpha_5, \alpha_6$ are used in a partial exchange between columns.

FIG. 11B illustrates a case in which a ROT is performed on an 8×8 frequency coefficient matrix. In the case of FIG. 11B, $\alpha_1, \alpha_2, \alpha_3, \alpha_4, \alpha_5, \alpha_6$ are used in a partial exchange between rows, and $\alpha_7, \alpha_8, \alpha_9, \alpha_{10}, \alpha_{11}, \alpha_{12}$ are used in a partial exchange between columns.

FIG. 11C illustrates a case in which a ROT is performed on a frequency coefficient matrix having a size equal to or greater than 16×16.

As described above in relation to FIGS. 11A and 11B, as a size of a frequency coefficient matrix is increased, the number of angle parameters is increased. In order to perform the ROT on the 4×4 frequency coefficient matrix of FIG. 11A, six angle parameters are necessary, and in order to perform the ROT on the 8×8 frequency coefficient matrix of FIG. 11B, twelve angle parameters are necessary.

Although a compression rate is improved in a manner that an adjusted frequency coefficient matrix is generated by performing the ROT on the frequency coefficient matrix, and then quantization and entropy encoding are performed on the adjusted frequency coefficient matrix, if the number of angle parameters are increased so that an overhead is increased, a total amount of data is not decreased. Thus, a predetermined size, e.g., when the ROT is performed on a frequency coefficient matrix having a size equal to or greater than 16×16, coefficient sampling is used.

In other words, as illustrated in FIG. 11C, the ROT performing unit 1020 selects a sampled frequency coefficient matrix 1120 including only some of coefficients of a frequency coefficient matrix 1110, and then performs the ROT on the selected frequency coefficient matrix 1120. The ROT is not performed on the rest of parts 1130 of the frequency coefficient matrix 1110.

In order to achieve a sufficient effect of the ROT on a frequency coefficient matrix having a large size, it is necessary that the coefficients included in the frequency coefficient matrix 1120 have an effect on compression of image data. Thus, the ROT performing unit 1020 only selects coefficients that have a low frequency component and that may have a value other than 0, and performs the ROT on the coefficients.

In general, a frequency coefficient matrix that is generated as a result of a transform includes coefficients with respect to a low frequency component at an upper left corner of the frequency coefficient matrix. Thus, as illustrated in FIG. 11C, the ROT performing unit 1020 selects only coefficients positioned at an upper left corner of the frequency coefficient matrix 1110, and then performs the ROT. In an example of FIG. 11C, the ROT performing unit 1020 performs the ROT on the frequency coefficient matrix 1120 having a size of 8×8 in the same manner as the ROT in relation to FIG. 11B.

Referring to the ROT on the 4×4 frequency coefficient matrix of FIG. 11A, different results are obtained according to an application order of three angle parameters $\alpha_1, \alpha_2, \alpha_3$. That is, the three angle parameters are not independent from each other. An adjusted frequency coefficient matrix that is generated as a result of performing the ROT on a case in which the angle parameter $\alpha_1$ is first applied and then the angle parameter $\alpha_2$ is applied is different from an adjusted frequency coefficient matrix that is generated as a result of performing the ROT on a case in which the angle parameter $\alpha_2$ is first applied and then the angle parameter $\alpha_1$ is applied. This will be described in detail with reference to FIG. 12.

Figure 12:
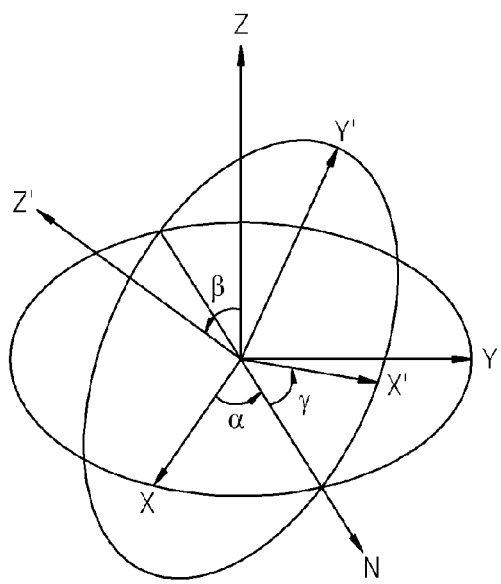
FIG. 12 is a diagram of Euler angles according to another exemplary embodiment.

FIG. 12 is a diagram of Euler angles according to another exemplary embodiment.

Referring to FIG. 12, it is possible to understand that an exchange between rows or between columns of a matrix is similar to rotation of coordinate axes in a three-dimensional (3D) space. That is, three rows or columns correspond to X, Y, and Z axes of 3D coordinates, respectively. With respect to the rotation of the coordinate axes in the 3D space, different results are obtained according to which axis rotates first. Thus, there have been many attempts to show the rotation of the coordinate axes in the 3D space, and a representative attempt from among the attempts is the Euler angles.

In FIG. 12, $\alpha, \beta, \gamma$ angles indicate the Euler angles. In FIG. 12, X, Y, and Z axes indicate coordinate axes before the rotation, and X', Y', and Z' axes indicate coordinate axes after the rotation. An N-axis is an intersection between an X-Y plane and an X'-Y' plane. Here, the N-axis is referred to as 'line of nodes'.

The angle $\alpha$ indicates an angle between the X-axis and the N-axis which rotate around Z-axis. The angle $\beta$ indicates an angle between the Z-axis and the Z'-axis between which rotate around the N-axis. The angle $\gamma$ indicates an angle between the N-axis and the X'-axis which rotate around the Z'-axis.

The rotation of the coordinate axes according to the Euler angles is given by Equation 2.

$$\begin{pmatrix} \cos\gamma & \sin\gamma & 0 \\ -\sin\gamma & \cos\gamma & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} \cos\alpha & \sin\alpha & 0 \\ -\sin\alpha & \cos\alpha & 0 \\ 0 & 0 & 1 \end{pmatrix} \quad \text{[Equation 2]}$$

A first matrix indicates rotation around the Z'-axis. A second matrix indicates rotation around the N-axis. A third matrix indicates rotation around the Z-axis.

In the one or more exemplary embodiments, the exchange between the rows or between the columns of the matrix may be indicated as rotation of coordinates axes using the Euler angles.

Referring back to FIGS. 9 and 10, the ROT performing unit 1020 of the transformer 910 performs the ROT on the frequency coefficient matrix, and thus generates the adjusted frequency coefficient matrix. The adjusted frequency coefficient matrix is input to the quantization unit 920.

The quantization unit 920 quantizes coefficients included in the adjusted frequency coefficient matrix according to a predetermined quantization step, and the entropy encoder 930 performs entropy encoding on the quantized adjusted frequency coefficient matrix. The entropy encoding may be performed by using context-adaptive variable arithmetic coding (CABAC) or context-adaptive variable length coding (CAVLC). In a case where the ROT is performed only on the frequency coefficient matrix 1120 including only some of coefficients due to a large size of the frequency coefficient matrix 1110, quantization and then entropy encoding are performed on the frequency coefficient matrix 1110 that includes the frequency coefficient matrix 1120 including the rotationally transformed some coefficients, and the rest of parts 1130.

The entropy encoder 930 performs entropy encoding on angle parameters used in the ROT performed by the transformer 910, and the image encoding apparatus 900 determines optimal angle parameters for the ROT according to a following procedure.

In order to efficiently perform compression, it is necessary for the optimal angle parameters to search for the optimal angle parameters. However, this is a multi-parameter problem having strongly non-smooth dependence on parameter. In order to solve this problem, a Monte Carlo method is used. Here, a Lehmer's random sequence number may be used to generate a random point in the Monte Carlo method. Instead of storing or transmitting an angle parameter used as a parameter, only one integer indicating a sequence number may be stored or transmitted. Thus, it is possible to decrease an overhead that is necessary to inform a decoder of an angle parameter used in the ROT.

That is, matters to be considered to determine combination of the optimal angle parameters are stated as below.
1. Reversible transform of a transform matrix
2. Rearrangement of an energy for more efficient coding
3. Minimization of information added by using the Lehmer's random sequence number Referring back to FIGS. 11A through 11C, parts that are revised by rotation of the frequency coefficient matrix are colored black, and parts that are not revised are colored white. In the 4×4 frequency coefficient matrix of FIG. 11A, six angle parameters involve in revision of fifteen coefficients according to an exchange between rows and between columns. In the 8×8 frequency coefficient matrix of FIG. 11B, twelve angle parameters involve in revision of sixty coefficients.

Referring to FIG. 11A, for the exchange between the rows, three angle parameters are necessary, and for the exchange between the columns, three angle parameters are further necessary. Thus, with respect to a 4×4 block, six angle parameters are necessary.

Referring to FIG. 11B, for the exchange between the rows, six angle parameters are necessary, and for the exchange between the columns, six angle parameters are further necessary. Thus, with respect to a 8×8 block, twelve angle parameters are necessary.

The image encoding apparatus 900 may perform the ROT according to following steps.

Step 1—Orthogonal transform family parameterization
Step 2—Monte Carlo method
Step 3—Lehmer's pseudo-random numbers
Step 4—Localization of diapason for optimal angle parameters
Step 5—Quasi-optimal basis Although a compression rate of an image is improved by using the ROT, if too many parameters are added, transmission of a video signal may achieve a better result than compression. In other words, there is a trade-off between the compression ratio and the overhead of additional parameters. For example, although an image signal in a 4×4 frequency coefficient matrix is compressed to a size near 0, if the compression requires sixteen additional parameters, it may not be necessary to perform the ROT. In this regard, it may be more efficient to transmit sixteen pixel values to a decoder. Thus, both of compression of an image signal, and minimization of an added overhead are important.

For this, the ROT performing unit 1020 searches for an optimal angle parameter while minimizing an overhead according to following steps.

<Step 1—Orthogonal Transform Family Parameterization>

In order to choose the optimal transform for current data, basis adjustment is required. The rotation of basis is chosen as basis modification. So the set of rotational angles describes basis modification uniquely.

Introduced rotational angles describe basis modification by the same way as Euler's angles describe the rotation of solid body in 3D space. This similarity explains the name of this algorithm.

In order to revise the basis, rotation of the basis is mainly selected. In the one or more exemplary embodiments, the rotation of the basis is performed by using an angle parameter. Here, the rotation of the basis, which is performed by using the angle parameter, is used. The angle parameter may be the Euler angle. However, the angle parameter is not limited to the Euler angle, and thus may include others that may indicate a level of a partial exchange of one or more values between rows and between columns of a matrix. Hereinafter, an example involving using the Euler angle will now be described.

The rotation is defined as Equation 3 by using a left multiplication $R_{horizontal}$ and a right multiplication $R_{vertical}$ of a frequency coefficient matrix D.

$$D' = R_{horizontal} \times D \times R_{vertical} \quad \text{[Equation 3]}$$

(D' indicates an adjusted frequency coefficient matrix that is rotationally transformed.)

The matrix $R_{horizontal}$ performs an exchange between rows of the frequency coefficient matrix D. The $R_{vertical}$ performs an exchange between columns of the frequency coefficient matrix D.

An example of the matrix $R_{horizontal}$ in a 4×4 block is given by Equation 4.

$$R_{horizontal} = \begin{pmatrix} A & B & C & 0 \\ D & E & F & 0 \\ G & H & I & 0 \\ 0 & 0 & 0 & 1 \end{pmatrix} \quad \text{[Equation 4]}$$

$A = \cos^\alpha \cos^\gamma - \sin^\alpha \cos^\beta \sin^\gamma$,
$B = -\sin^\alpha \cos^\gamma - \cos^\alpha \cos^\beta \sin^\gamma$,
$C = \sin^\beta \sin^\gamma$,
$D = \cos^\alpha \sin^\gamma + \sin^\alpha \cos^\beta \cos^\gamma$,
$E = -\sin^\alpha \sin^\gamma + \cos^\alpha \cos^\beta \cos^\gamma$,
$F = -\sin^\beta \cos^\gamma$,
$G = \sin^\alpha \sin^\beta$,
$H = \cos^\alpha \sin^\beta$,
$I = \cos^\beta$ In Equation 4, $\alpha$, $\beta$, $\gamma$ indicate the Euler angles.

Thus, with respect to a 4×4 frequency coefficient matrix, the Euler angles describe revision of twelve frequency coefficients by a group of six parameters of $\alpha_1, \alpha_2, \ldots, \alpha_6$. With respect to a 8×8 frequency coefficient matrix, twelve Euler angles of $\alpha_1, \alpha_2, \ldots, \alpha_{12}$ describe revision of sixty frequency coefficients.

<Step 2—Monte Carlo Method>

After a degree of freedom is decreased to six angle parameters (twelve angle parameters in the case of the 8×8 frequency coefficient matrix), it is necessary to check an optimization matter in consideration of saving bits. That is, it is necessary to optimize a method of selecting a group of angle parameters.

The optimization has a difficulty in that a high-dimensional domain of a parameter (six or twelve angle parameters) is used, and compression of an image is non-smoothly dependent on used parameters. In general, the difficulty is solved by using the Monte Carlo method.

The core of the Monte Carlo method is to perform a plurality of attempts. That is, a compression rate is measured from several points, and then a best point therefrom is selected. In the Monte Carlo method, a quality of a random point in a multi-dimensional domain is highly important (in particular, the quality is more important according to elevation of a dimension). A pseudo-random point is preferred to a uniform grid point. This will be described in FIG. 13 with reference to a two-dimensional (2D) case.

Figure 13:
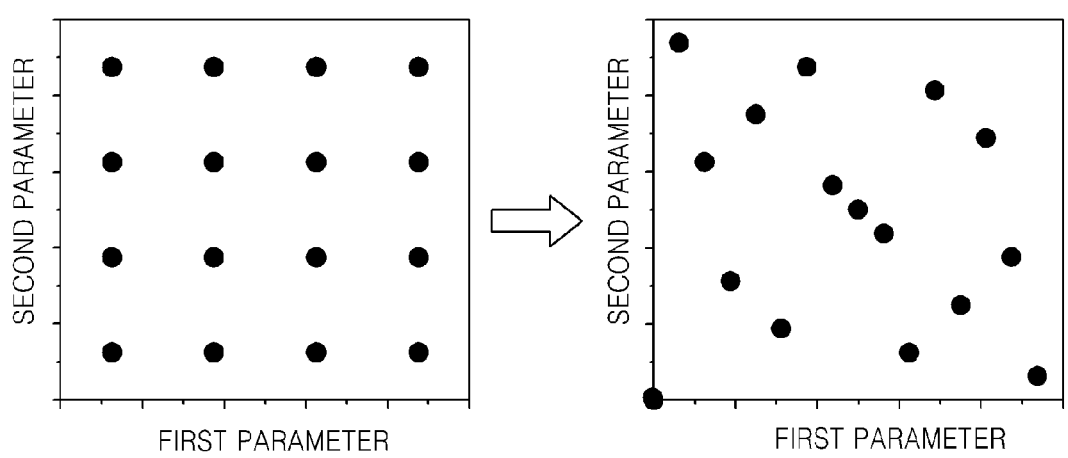
FIG. 13 illustrates pseudo-random points according to another exemplary embodiment.

FIG. 13 illustrates pseudo-random points according to another exemplary embodiment.

A left diagram of FIG. 13 illustrates uniform grid points, and a right diagram of FIG. 13 illustrates first sixteen points according to a pseudo-random process.

In a case where the uniform grid points are used, in spite of sixteen points of the Monte Carlo method, only four different values are checked with respect to a first parameter (and a second parameter). On the other hand, in a case where the pseudo-random points are used, sixteen different values are checked with respect to a first parameter (and a second parameter) by sixteen points. That is, when the pseudo-random points are used, various values of the first and second parameters are sufficiently checked with respect to sixteen points. In particular, with respect to the Monte Carlo method, the use of the pseudo-random points is more advantageous than the use of the uniform grid points, according to an increase of the number of parameters.

<Step 3—Lehmer's Pseudo-Random Numbers>

A pseudo-random sequence may be generated by using various methods. One of the most efficient methods is to use a Lehmer number. This is an artificially generated sequence, and is close to actual random numbers that are uniformly distributed. An algorithm for generating a Lehmer sequence is well known, and thus a detailed description thereof is omitted here. According to an exemplary embodiment, at least $10^{13}$ unrepeated points are provided. The Lehmer sequence is an artificial sequence, and the algorithm for generating the Lehmer sequence is well known, so that a decoder may easily recalculate it.

By using the Lehmer sequence, a combination of angle parameters may be coded by using one information (that is, a number in a random sequence). In a six-dimensional (in the case of a 4×4 frequency coefficient matrix) or twelve-dimensional (in the case of an 8×8 frequency coefficient matrix) parameter domain, random points corresponding to the combination of the angle parameters are generated, a compression rate is measured after compression is performed by using the random points, and then an optimal parameter point is selected. Instead of storing or transmitting the combination of the angle parameters, a number of the Lehmer sequence corresponding to the optimal parameter point is stored or transmitted.

If an ROT is performed on $2^p$ points, that is, combination of angle parameters in the Monte Carlo method, only p bits of information are included as an overhead.

<Step 4—Localization of Diapason for Optimal Angle Parameters>

According to one or more exemplary embodiments, an optimal rotation angle has a value near 0 degrees or 180 degrees (π radian). This means that a basis for a transform to a frequency domain, e.g., a DCT basis or a KLT basis is almost optimized.

Thus, angle parameters according to the one or more exemplary embodiments are only used to perform a partial exchange (an angle near 0 degrees in the case of the Euler angles) of one or more values between rows and between columns, or to perform the partial exchange, and a change (an angle near 180 degrees in the case of the Euler angles) of a sign of a basis element. That is, a diapason of parameters used in the one or more exemplary embodiments is limited to a specific part of a domain, and this limitation is referred to as localization.

By performing the localization on the diapason of the parameters, the number of bits with respect to an overhead is decreased. If it is assumed that points to be checked are limited to a specific part in FIG. 13, the number of points to be checked so as to search for optimal combination of the angle parameters is decreased.

Also, if the number of points to be checked is fixed (that is, in a case where the number of bits used as overheads is fixed), and the localization is applied, more points in a smaller angle may be checked so that a compression rate may be increased.

<Step 5—Quasi-Optimal Basis>

By performing the aforementioned steps 1 through 4, it is possible to select an optimal basis with respect to all blocks (blocks having a size equal to or greater than 4×4 and 8×8). An overhead having 8 or 10 bytes may be added to each block in a high bit rate. When a bit rate is decreased, it is preferred to select a quasi-optimal basis.

The quasi-optimal basis means that the same rotation is applied to a group of all transformation units or some of the transformation units included in a slice or a picture. If optimal rotation is applied to each block, a compression rate with respect to an image is increased but an overhead is also increased.

In order to determine which unit from among a transformation unit, a group of transformation units, a slice, and a picture is applied the same rotation, various experiments may be performed.

After a transform to a frequency domain at a low bit rate, a quantization coefficient value in many parts of a frequency coefficient matrix becomes 0. Thus, with respect to the parts of the frequency coefficient matrix, it is not necessary to perform the ROT and to transmit additional information regarding a rotation angle value.

The image encoding apparatus 900 performs the ROT on a combination of a plurality of angle parameters by using the Monte Carlo method, and repeatedly performs quantization and entropy encoding, thereby determining optimal combination of the angle parameters. Also, the image encoding apparatus 900 does not encode the angle parameters but encodes a Lehmer's pseudo-random sequence number as information regarding the determined optimal combination of the angle parameters. Here, by using the localization and the quasi-optimal basis, the information regarding the angle parameters may be encoded at a higher efficiency.

Figure 14:
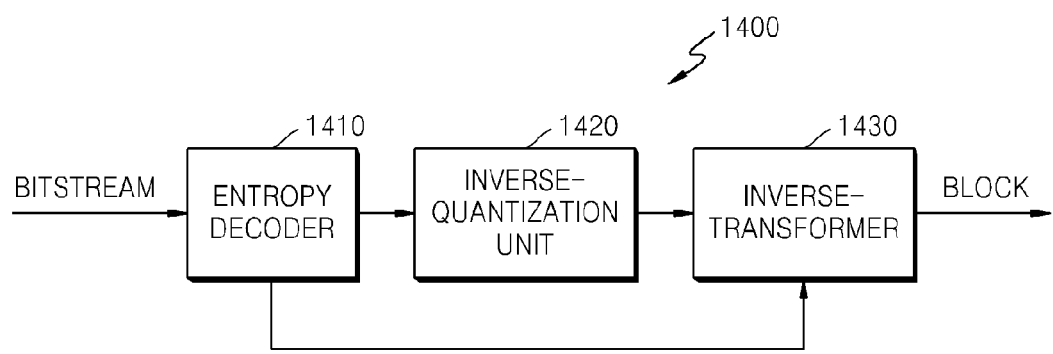
FIG. 14 is a block diagram of an image decoding apparatus according to another exemplary embodiment.

FIG. 14 is a block diagram of an image decoding apparatus 1400 according to another exemplary embodiment. The image decoding apparatus 1400 of FIG. 14 may be a module that is included in the image decoding apparatus 200 of FIG. 2 or in the image decoder 500 of FIG. 5 and that performs image decoding procedures to be described later. Referring to FIG. 14, the image decoding apparatus 1400 includes an entropy decoder 1410, an inverse-quantization unit 1420, and an inverse-transformer 1430.

The entropy decoder 1410 receives a bitstream, and performs entropy decoding on an adjusted frequency coefficient matrix of a predetermined block. The adjusted frequency coefficient matrix is generated in a manner that a frequency coefficient matrix is generated by transforming the predetermined block to a frequency domain, and an ROT is performed on the frequency coefficient matrix. Also, for an inverse-ROT, the entropy decoder 1410 may decode information about an angle parameter that is used in the ROT. Similar to the entropy encoder 930, the entropy decoder 1410 performs the entropy decoding by using CABAC or CAVLC.

The inverse-quantization unit 1420 inverse-quantizes the adjusted frequency coefficient matrix that is entropy decoded by the entropy decoder 1410. The inverse-quantization is performed according to quantization steps for the encoding operation.

The inverse-transformer 1430 generates a frequency coefficient matrix by performing the inverse-ROT on the adjusted frequency coefficient matrix, and inverse-transforms the frequency coefficient matrix to a pixel domain. This will be described in detail with reference to FIG. 15.

Figure 15:
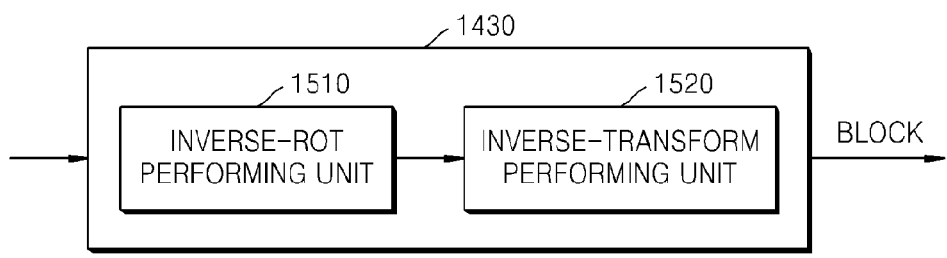
FIG. 15 is a diagram of the inverse-transformer according to another exemplary embodiment.

FIG. 15 is a diagram of the inverse-transformer 1430 according to another exemplary embodiment.

Referring to FIG. 15, the inverse-transformer 1430 includes an inverse-ROT performing unit 1510 and an inverse-transform performing unit 1520.

The inverse-ROT performing unit 1510 performs the inverse-ROT on the inverse-quantized adjusted frequency coefficient matrix that is received from the inverse-quantization unit 1420. The inverse-ROT performing unit 1510 inversely performs the ROT described in relation to FIGS. 11A through 11C, 12, and 13. Here, the inverse-ROT performing unit 1510 may perform the inverse-ROT by referring to information regarding an angle parameter that is entropy-decoded by the entropy decoder 1410. According to the information regarding the angle parameter, one or more values between rows and between columns of the adjusted frequency coefficient matrix are partially exchanged, so that the frequency coefficient matrix is generated.

In a case where the ROT is performed on the frequency coefficient matrix 1120 including only some of the coefficients of the frequency coefficient matrix 1110, the inverse-ROT is performed on the frequency coefficient matrix 1120 including only some of the coefficients, so that the frequency coefficient matrix 1110 is generated.

The inverse-transform performing unit 1520 receives the frequency coefficient matrix from the inverse-ROT performing unit 1510, and inverse-transforms the frequency coefficient matrix to the pixel domain. By inversely performing a DCT or KLT, the inverse-transform performing unit 1520 may inverse-transform the frequency coefficient matrix. As a result of the inverse-transform, a predetermined block of the pixel domain is reconstructed.

Figure 16:
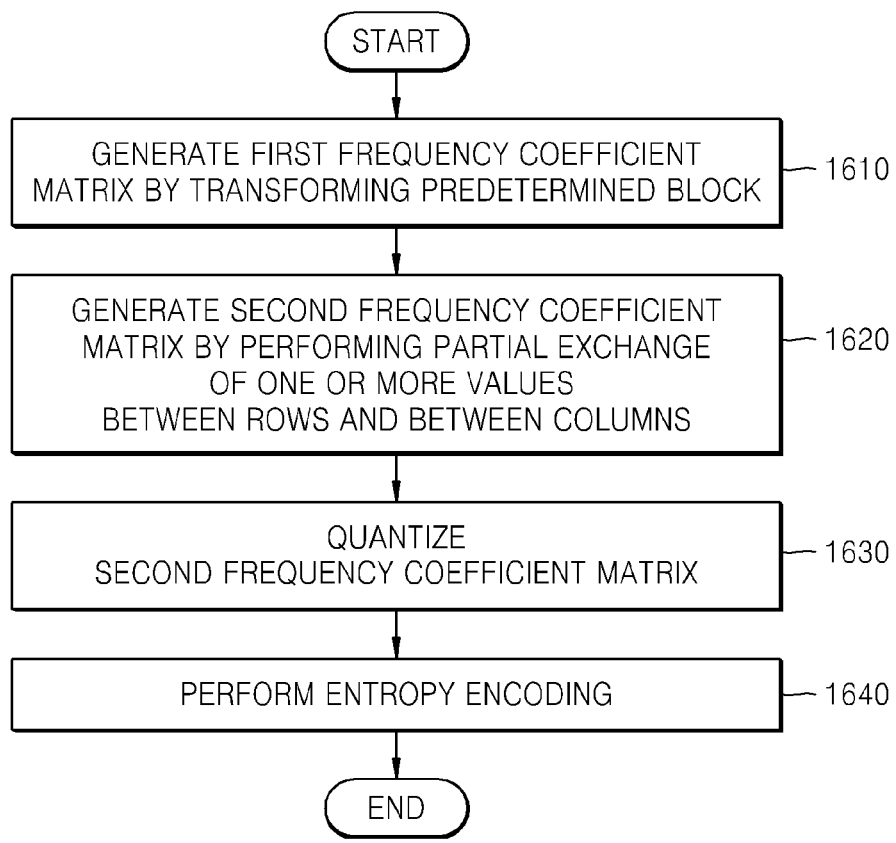
FIG. 16 is a flowchart of a method of encoding an image, according to an exemplary embodiment.

FIG. 16 is a flowchart of a method of encoding an image, according to an exemplary embodiment.

Referring to FIG. 16, in operation 1610, an image encoding apparatus generates a frequency coefficient matrix by transforming a predetermined block to a frequency domain. The image encoding apparatus receives the predetermined block, performs a DCT or KLT on the predetermined block, and then generates the frequency coefficient matrix including coefficients of the frequency domain.

In operation 1620, the image encoding apparatus generates an adjusted frequency coefficient matrix by performing a partial exchange of one or more values between rows and between columns of the frequency coefficient matrix generated in operation 1610. The image encoding apparatus generates the adjusted frequency coefficient matrix by performing the ROT, which is described in relation to FIGS. 11A through 11C, 12, and 13, on the frequency coefficient matrix.

When a size of the frequency coefficient matrix is large (e.g., the size equal to or greater than 16×16), a matrix including only some of the coefficients of the frequency coefficient matrix may be selected, and the ROT may be performed on the matrix including only some of the coefficients. In selection of the matrix including only some of the coefficients, a matrix only including coefficients with respect to a low frequency component may be selected.

In operation 1630, the image encoding apparatus quantizes the adjusted frequency coefficient matrix that is generated in operation 1620. The adjusted frequency coefficient matrix is quantized according to a predetermined quantization step.

In operation 1640, the image encoding apparatus performs entropy encoding on the adjusted frequency coefficient matrix that is quantized in operation 1630. The entropy encoding is performed by using CABAC or CAVLC. In operation 1640, the image encoding apparatus also performs entropy encoding on information regarding an angle parameter that is used in the partial exchange of one or more values between rows and between columns in operation 1620. The angle parameter is a parameter that indicates a level of the partial exchange of one or more values between rows and between columns.

The image encoding apparatus may repeatedly perform operations 1620 through 1640 on a combination of a plurality of angle parameters, and thus may determine an optimal angle parameter. By repeatedly performing encoding on the combination of the plurality of angle parameters, an angle parameter indicating an optimal compression rate may be selected.

The combination of the plurality of angle parameters may be selected by using the Monte Carlo method, and may correspond to Lehmer's pseudo-random numbers. In a case where the combination of the plurality of angle parameters correspond to the Lehmer's pseudo-random numbers, the information regarding the angle parameter, which is encoded in operation 1640, may be a Lehmer's pseudo-random sequence number corresponding to the determined optimal angle parameter.

Figure 17:
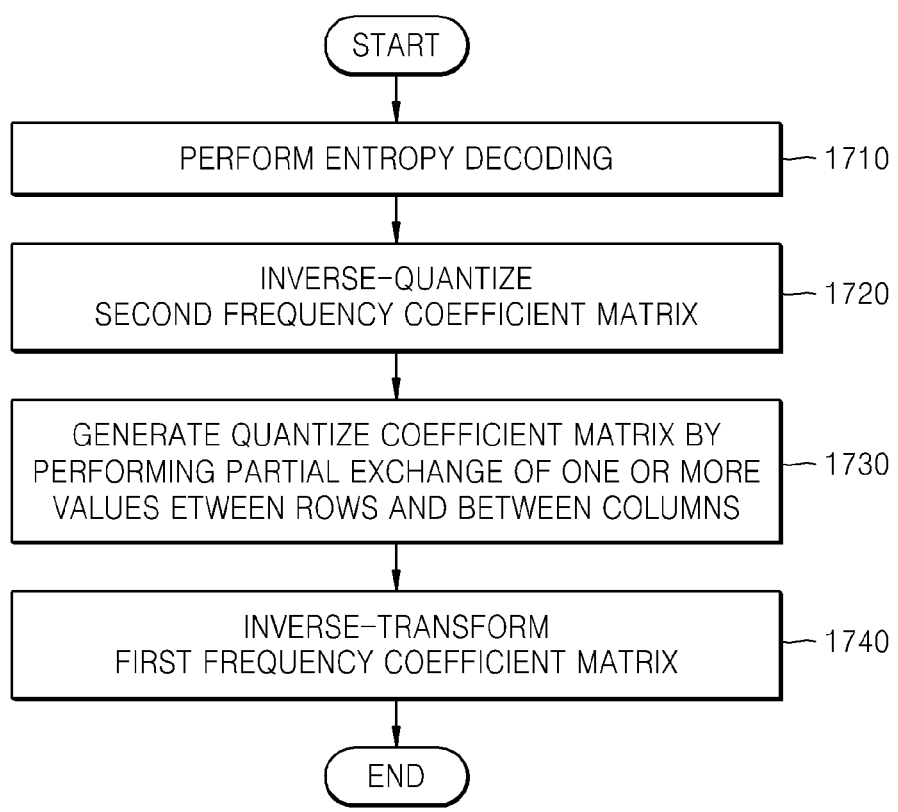
FIG. 17 is a flowchart of a method of decoding an image, according to another exemplary embodiment.

FIG. 17 is a flowchart of a method of decoding an image, according to another exemplary embodiment.

Referring to FIG. 17, in operation 1710, an image decoding apparatus receives a bitstream with respect to a predetermined block, and performs entropy decoding on information regarding an angle parameter and an adjusted frequency coefficient matrix. The adjusted frequency coefficient matrix is a matrix formed by performing an ROT on all or some of a frequency coefficient matrix.

In operation 1720, the image decoding apparatus inverse-quantizes the adjusted frequency coefficient matrix that is entropy-decoded in operation 1710. The image decoding apparatus inverse-quantizes coefficients of the adjusted frequency coefficient matrix according to a quantization step that is used in image encoding.

In operation 1730, the image decoding apparatus generates a frequency coefficient matrix by performing a partial exchange of one or more values between rows and between columns of the adjusted frequency coefficient matrix that is inverse-quantized in operation 1720. The image decoding apparatus generates the frequency coefficient matrix by inversely performing the ROT described in relation to FIGS. 11A through 11C, 12, and 13, by referring to the information regarding the angle parameter which is entropy-decoded in operation 1710.

As described above, in a case where a matrix including only some of coefficients of the frequency coefficient matrix is rotationally transformed in the encoding procedure, the inverse-ROT is performed on the matrix including only some of the coefficients, so that the frequency coefficient matrix is generated.

In operation 1740, the image decoding apparatus inverse-transforms the frequency coefficient matrix that is generated in operation 1730. By performing a DCT or KLT on the frequency coefficient matrix, a block of a pixel domain is reconstructed.

As described above, the methods and apparatuses for encoding and decoding an image according to the exemplary embodiments may encode a frequency coefficient matrix at a higher compression rate based on solid mathematical bases, and thus may significantly improve a compression rate of an entire image encoding operation.

The exemplary embodiments can also be embodied as computer-readable codes on a computer-readable recording medium. The computer-readable recording medium is any data storage device that can store data, which can be thereafter be read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

For example, each of the image encoding apparatus, the image decoding apparatus, the image encoder, and the image decoder according to the one or more exemplary embodiments may include a bus coupled to each unit in an apparatus as illustrated in FIGS. 1-2, 4-5, 9-10, and 14-15, and at least one processor coupled to the bus. Also, each of the image encoding apparatus, the image decoding apparatus, the image encoder, and the image decoder according to the one or more exemplary embodiments may include a memory coupled to the at least one processor that is coupled to the bus so as to store commands, received messages or generated messages, and to execute the commands.

While exemplary embodiments have been particularly shown, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the exemplary embodiments but by the appended claims.

What is claimed is:

1. A method of encoding an image, the method comprising:
generating a first frequency coefficient matrix;
generating a second frequency coefficient matrix by performing a partial exchange of one or more values between at least two rows or between at least two columns of the first frequency coefficient matrix based on an angle parameter;
quantizing the second frequency coefficient matrix; and
entropy-encoding the second frequency coefficient matrix and information regarding the angle parameter,
wherein the angle parameter is a parameter that indicates a level of the partial exchange of the one or more values between the at least two rows or between the at least two columns of the first frequency coefficient matrix.

2. The method of claim 1, wherein the angle parameter is a parameter with respect to an Euler angle.

3. The method of claim 1, wherein the generating of the second frequency coefficient matrix comprises multiplying a matrix for performing the partial exchange between the at least two rows of the first frequency coefficient matrix by a left side of the first frequency coefficient matrix, and multiplying a matrix for performing the partial exchange between the at least two columns of the first frequency coefficient matrix by a right side of the first frequency coefficient matrix.

4. The method of claim 3, wherein the matrix for performing the partial exchange between the at least two rows or the at least two columns of the first frequency coefficient matrix is $$\begin{pmatrix} A & B & C & 0 \\ D & E & F & 0 \\ G & H & I & 0 \\ 0 & 0 & 0 & 1 \end{pmatrix},$$

wherein
$A = \cos^\alpha \cos^\gamma - \sin^\alpha \cos^\beta \sin^\gamma$,
$B = -\sin^\alpha \cos^\gamma - \cos^\alpha \cos^\beta \sin^\gamma$,
$C = \sin^\beta \sin^\gamma$,
$D = \cos^\alpha \sin^\gamma + \sin^\alpha \cos^\beta \cos^\gamma$,
$E = -\sin^\alpha \sin^\gamma + \cos^\alpha \cos^\beta \cos^\gamma$,
$F = -\sin^\beta \cos^\gamma$,
$G = \sin^\alpha \sin^\beta$,
$H = \cos^\alpha \sin^\beta$,
$I = \cos^\beta$, and
wherein the $\alpha$, $\beta$, $\gamma$ are Euler angles.

5. The method of claim 1, further comprising, with respect to different angle parameters, repeatedly performing the generating of a second frequency coefficient matrix by performing a partial exchange of one or more values between at least two rows or between at least two columns of the first frequency coefficient matrix, the quantizing of the second frequency coefficient matrix, and the entropy-encoding of the second frequency coefficient matrix; and
selecting an angle parameter from among the different angle parameters corresponding to a highest compression rate.

6. The method of claim 5, wherein the selecting of the angle parameter from among the different angle parameters comprises:
with respect to the different angle parameters and by using a Monte Carlo method, repeatedly performing the generating of the second frequency coefficient matrix by performing the partial exchange of the one or more values between the at least two rows or between the at least two columns of the first frequency coefficient matrix, the quantizing of the second frequency coefficient matrix, and the entropy-encoding of the second frequency coefficient matrix; and
selecting the angle parameter from among the different angle parameters corresponding to the highest compression rate.

7. The method of claim 5, wherein the selecting of the angle parameter comprises:
corresponding the different angle parameters to a random sequence; and
with respect to the different angle parameters, repeatedly performing the generating of the second frequency coefficient matrix by performing the partial exchange of the one or more values between the at least two rows or between the at least two columns of the first frequency coefficient matrix, the quantizing of the second frequency coefficient matrix, and the entropy-encoding of the second frequency coefficient matrix; and selecting the angle parameter from among the different angle parameters corresponding to the highest compression rate, and wherein the entropy-encoding of the information regarding the angle parameter comprises:

encoding a number of the random sequence corresponding to the selected angle parameter, as the information regarding the angle parameter.

8. The method of claim 7, wherein the random sequence is Lehmer's pseudo-random numbers.

9. The method of claim 1, wherein the generating of the second frequency coefficient matrix comprises:

selecting a matrix comprising only some of coefficients of the first frequency coefficient matrix; and generating the second frequency coefficient matrix by performing a partial exchange of one or more values between at least two rows or between at least two columns of the matrix comprising the selected coefficients, based on an angle parameter.

10. The method of claim 9, wherein the selected coefficients correspond to a low frequency component from among the coefficients of the first frequency coefficient matrix.

11. An image encoding apparatus comprising:

a transformer that generates a first frequency coefficient matrix and generates a second frequency coefficient matrix by performing a partial exchange of one or more values between at least two rows or between at least two columns of the first frequency coefficient matrix based on an angle parameter;

a quantization unit that quantizes the second frequency coefficient matrix; and an entropy encoder that entropy-encodes the second frequency coefficient matrix and information regarding the angle parameter, wherein the angle parameter is a parameter that indicates a level of the partial exchange of the one or more values between the at least two rows or between the at least two columns of the first frequency coefficient matrix.

12. A method of decoding an image, the method comprising:

entropy-decoding a second frequency coefficient matrix and information regarding an angle parameter;

inverse-quantizing the second frequency coefficient matrix;

generating a first frequency coefficient matrix by performing a partial exchange of one or more values between at least two rows or between at least two columns of the second frequency coefficient matrix based on the angle parameter; and inverse-transforming the first frequency coefficient matrix to a pixel domain, and reconstructing a predetermined block, wherein the angle parameter is a parameter that indicates a level of the partial exchange of the one or more values between the at least two rows or between the at least two columns of the second frequency coefficient matrix.

13. The method of claim 12, wherein the angle parameter is a parameter with respect to an Euler angle.

14. The method of claim 12, wherein the generating of the first frequency coefficient matrix comprises multiplying a matrix for performing the partial exchange between the at least two rows of the second frequency coefficient matrix by a left side of the second frequency coefficient matrix, and multiplying a matrix for performing the partial exchange between the at least two columns of the second frequency coefficient matrix by a right side of the second frequency coefficient matrix.

15. The method of claim 12, wherein the information regarding the angle parameter is a number of a random sequence corresponding to the angle parameter.

16. The method of claim 15, wherein the random sequence is Lehmer's pseudo-random numbers.

17. An image decoding apparatus comprising:

an entropy decoder that entropy-decodes a second frequency coefficient matrix and information regarding an angle parameter;

an inverse-quantization unit that inverse-quantizes the second frequency coefficient matrix;

an inverse-transformer that generates a first frequency coefficient matrix by performing a partial exchange of one or more values between at least two rows or between at least two columns of the second frequency coefficient matrix based on the angle parameter; and inverse-transforms the first frequency coefficient matrix to a pixel domain, and reconstructs a predetermined block, wherein the angle parameter is a parameter that indicates a level of the partial exchange of the one or more values between the at least two rows or between the at least two columns of the second frequency coefficient matrix.

18. A non-transitory computer readable recording medium having recorded thereon a program that when executed by a computer performs a method of encoding an image, the method comprising:

generating a first frequency coefficient matrix;

generating a second frequency coefficient matrix by performing a partial exchange of one or more values between at least two rows or between at least two columns of the first frequency coefficient matrix based on an angle parameter;

quantizing the second frequency coefficient matrix; and entropy-encoding the second frequency coefficient matrix and information regarding the angle parameter, wherein the angle parameter is a parameter that indicates a level of the partial exchange of the one or more values between the at least two rows or between the at least two columns of the first frequency coefficient matrix.

19. A non-transitory computer readable recording medium having recorded thereon a program that when executed by a computer performs a method of decoding an image, the method comprising:

entropy-decoding a second frequency coefficient matrix and information regarding an angle parameter;

inverse-quantizing the second frequency coefficient matrix;

generating a first frequency coefficient matrix by performing a partial exchange of one or more values between at least two rows or between at least two columns of the second frequency coefficient matrix based on the angle parameter; and inverse-transforming the first frequency coefficient matrix to a pixel domain, and reconstructing a predetermined block, wherein the angle parameter is a parameter that indicates a level of the partial exchange of the one or more values between the at least two rows or between the at least two columns of the second frequency coefficient matrix.

* * * * *